United States Patent [19]

Long et al.

[11] 3,780,584
[45] Dec. 25, 1973

[54] EROSION RESISTENT SENSING DEVICE
[75] Inventors: William P. Long, Chester; Walter M. Sawyer, West Caldwell; Lionel J. De Paula Arias, Parsippany, all of N.J.
[73] Assignee: Foster Wheeler Corporation, Livingston, N.J.
[22] Filed: July 30, 1971
[21] Appl. No.: 167,729

[52] U.S. Cl. .............................. 73/349, 285/334.1
[51] Int. Cl. .......................................... G01k 13/02
[58] Field of Search ............. 73/346–349; 285/334.1

[56] References Cited
UNITED STATES PATENTS
| | | | |
|---|---|---|---|
| 1,431,212 | 10/1922 | Boyce | 73/347 |
| 1,993,897 | 3/1935 | Renard | 73/346 X |
| 3,085,426 | 4/1963 | Freedman et al. | 73/86 |
| 1,609,606 | 12/1926 | Clawson | 285/334.1 X |
| 1,806,710 | 5/1931 | Ross, Jr. | 285/334.1 X |

FOREIGN PATENTS OR APPLICATIONS
| | | | |
|---|---|---|---|
| 435,715 | 2/1925 | Germany | 73/346 |
| 676,375 | 8/1935 | Germany | 74/349 |

Primary Examiner—Jerry W. Myracle
Attorney—John Maier, III et al.

[57] ABSTRACT

A sensing device for sensing a characteristic of an erosive fluid stream. The device has a sensing element with a bearing surface which bears against a seat member with an end of the sensing element projecting into a conduit through which the erosive fluid flows. The sensing element may be rotated when one side is excessively eroded or withdrawn and replaced completely with another sensing element so that the characteristic can be sensed in spite of the erosiveness of the flowing fluid.

5 Claims, 1 Drawing Figure

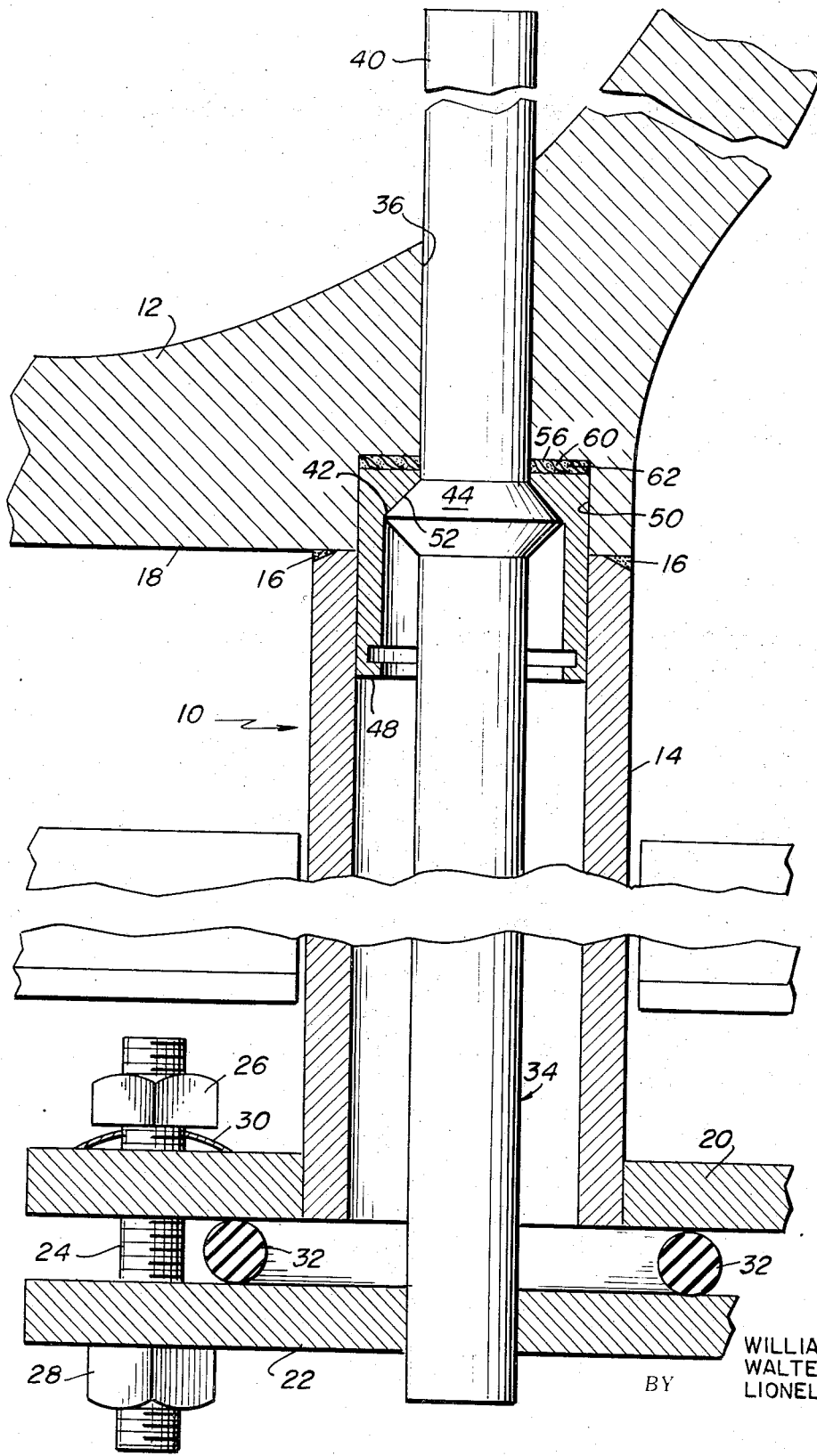

EROSION RESISTENT SENSING DEVICE

BACKGROUND OF THE INVENTION

There are situations in industry where it is necessary to measure a characteristic of a fluid stream which is erosive. An example is found in ethylene cracking plants where carbon particles form in the hydrocarbon gas within certain temperature ranges. This phenomenon is commonly called "coking." The carbon particles are abrasive and will erode an object they impinge against.

The erosive nature of the gas and entrained carbon particles makes it difficult to measure a characteristic of the gas when it is flowing. For example, if it is desired to measure the temperature of the gas, a sensing element such as a thermocouple can be inserted into the gas stream but due to the abrasiveness of the moving carbon particles, the sensing element will eventually be eroded so that it is no longer accurate. It has been found that erosion will make such an element inoperable within a fairly short time.

One solution is to provide a sensing device which can be removed and replaced by a new one. A drawback to such an arrangement is that it is expensive to frequently replace the sensing device with a new one and replacement may cause damage to the conduit. Another disadvantage is that in order for the device to be easily removable, it will inherently be less than leak proof.

SUMMARY OF THE INVENTION

It is an object of the present invention to overcome drawbacks in the prior art such as those discussed above. Accordingly, a sensing device for sensing a characteristic of an erosive fluid stream flowing through a conduit having an opening in the side thereof is provided with an annular seat member which has an annular seating surface and is adapted to be mounted exteriorly of the conduit, an annular gasket adapted to be positioned between the seat member and the conduit and a sensing element with an annular bearing surface between its ends which can be forced against the seat member which in turn forces the gasket against the conduit. With such an arrangement, the sensing element can be rotated when one side thereof becomes eroded to present a new side against which the flowing fluid can impinge so that the element will still be operable to sense the characteristic.

BRIEF DESCRIPTION OF THE DRAWING

The drawing is an end view, partly in section, with parts broken away, of a sensing device made in accordance with the present invention installed in a conduit.

DETAILED DESCRIPTION OF THE PREFERRED EMBODIMENT

The drawing shows an sensing device 10 made in accordance with the present invention mounted on a conduit 12 through which an erosive fluid such as hot ethane is flowing. A cylindrical support 14 is welded at 16 to the bottom surface 18 of the sidewall of the conduit 12. A flange 20 is secured to the bottom of the support 14 and projects radially outward. Parallel with the flange 20 is a flange 22 which is bolted adjacent to its periphery to the flange 20 by bolts 24 only one of which is shown in the drawing for the sake of clarity. The bolt 24 has on it two nuts 26 and 28, the upper of which 26 is pushed upwardly and away from the flange 20 by a spring 30 placed between the nut 26 and flange 20.

A ring seal 32 between the flanges 20 and 22 is compressed between them under this action. Secured to the flange 22 is a sensing element 34 which projects upwardly through the support 14 and through a cylindrical orifice 36 in the side wall of the conduit 12. The sensing element 34 has an exposed end 40 which contains structure for sensing a characteristic in fluid flowing through the conduit 12. For example, a thermocouple imbedded in the exposed end 40 would sense the temperature of the fluid within the conduit 12. Between the ends of the sensing element 34 is an annular outwardly flared portion 42 which has a bearing surface 44 which is in the shape of a frustrum.

An annular seat member 48 which fits within the support 14 so as to engage against its inner wall at the upper end thereof, projects upwardly into a recession 50 in the side wall of the conduit 12. The seat member 48 has a downwardly facing seating surface 52 which engages flatly against the bearing surface 44 of the sensing element 34. The bearing surface 44 and the seating surface 52 are tapered so that when the nuts 26 and/or 28 are tightened to urge the flange 22 and sensing element 34 upwardly, the bearing surface 42 will seal against the seating surface 52 and push the seating member 48 upwardly. An annular gasket 56 is placed between the seat member 48 and the conduit 12. It fits against the conduit 12 at the top of the recession 50 and consists of a spiral winding of stainless steel strip 60 and an alternate winding of asbestos 62.

Thus, when the sensing device is mounted as shown in the drawing, and the sensing element 34 is pushed upwardly against the seating surface 52, the gasket 56 will be slightly compressed between the seating member 48 and the top of the recession 50 in the side of the conduit 12. This will prevent any leakage of fluid down along the sensing element or about the outer surface of the seating member 48. A secondary seal is provided in that the sealing ring 32 is compressed between the flanges 20 and 22.

When the exposed end 40 of the sensing element 34 becomes excessively eroded, the flange 22 is released with respect to the flange 20 by untightening one of the nuts 26 or 28. The flange 22 is then rotated and secured once again with respect to the flange 20 by retightening the loosened nut. This expediency is made possible of course by the provision of an appropriate number of holes through each of the flanges 20 and 22. A new face of the exposed end 40 of the sensing element 34 which has not yet been eroded is then faced against the oncoming stream of abrasive fluid.

When it is desired to replace the sensing element 34, it is only necessary to remove enough nuts to allow the flange 22 and the attached element 34 to be withdrawn from the support 14. A new unit consisting of the flange 22 and sensing element 34 and seat member 48 is then inserted and secured in the manner shown in the drawing. It is preferable that the seat member 48 be replaced when the sensing element 34 is replaced to assure a well matched pair of surfaces 42 and 52.

The foregoing describes the one preferred embodiment of the present invention, other embodiments being possible without exceeding the scope of the present invention as defined in the following claims.

What is claimed is:

1. In combination:

a conduit for flowing an erosive fluid stream, said conduit having a recession at the outer surface of the sidewall thereof, and an orifice coaxial with and of a smaller diameter than said recession, said orifice extending from said recession through said sidewall generally perpendicular to the direction of flow of said stream;

an annular seat member mounted exteriorly of said conduit in said recession, said seat member having an annular frustum-shaped seating surface;

an annular gasket positioned between said seat member and said conduit;

an elongated sensing element, said sensing element having an annular frustum-shaped bearing surface between the ends thereof and positioned to extend through said recession and said orifice and into said conduit generally perpendicular to the direction of flow of said stream with said bearing surface sealingly engaging said seating surface; and means to slectively urge said sensing element toward said stream so that said bearing surface is urged against and sealingly engages said seating surface and said seat member urges said gasket against said conduit, whereby when said means are not actuated to selectively urge said sensing element, said sensing element can be rotated about the longitudinal axis thereof.

2. The combination defined in claim 1 further comprising a cylindrical support projecting outwardly from said conduit, said seat member being positioned within and at one end of said cylindrical support.

3. The combination defined in claim 2 wherein said sensing element is circular in cross-section with said bearing surface projecting generally outwardly therefrom, with said seating surface facing generally downwardly.

4. The combination defined in claim 3 wherein said bearing surface extends outwardly and downwardly.

5. The combination defined in claim 4 wherein said means is a first flange projecting outwardly from said support, a second flange projecting outwardly from the end of said sensing element farthest from said conduit and a plurality of bolts for securing said flanges to each other and urging said second flange toward said conduit so that when said bolts are not used to secure said flanges to each other, said second flange and said sensing element can be rotated about the axis of said sensing element.

* * * * *